United States Patent
Anehem et al.

(10) Patent No.: US 7,333,514 B2
(45) Date of Patent: Feb. 19, 2008

(54) FLEXIBLE FRAME SCHEDULER FOR SIMULTANEOUS CIRCUIT-AND PACKET-SWITCHED COMMUNICATION

(75) Inventors: Magnus Anehem, Bålsta (SE); Stefan Nilsson, Lund (SE); Bo Lilliehorn, Stockholm (SE); Sven Jerlhagen, Järfälla (SE); Aysegul Findikli, Palo Alto, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1010 days.

(21) Appl. No.: 10/196,347

(22) Filed: Jul. 16, 2002

(65) Prior Publication Data
US 2003/0031208 A1 Feb. 13, 2003

Related U.S. Application Data

(60) Provisional application No. 60/311,273, filed on Aug. 9, 2001.

(51) Int. Cl.
*H04J 3/24* (2006.01)
(52) U.S. Cl. ..................................... 370/474
(58) Field of Classification Search ............... None
See application file for complete search history.

(56) References Cited

U.S. PATENT DOCUMENTS

| | | | |
|---|---|---|---|
| 6,078,733 A | 6/2000 | Osborne | |
| 6,266,702 B1 | 7/2001 | Darnell et al. | |
| 6,477,168 B1 * | 11/2002 | Delp et al. | 370/395.4 |
| 6,480,505 B1 | 11/2002 | Johansson et al. | |
| 6,975,613 B1 * | 12/2005 | Johansson | 370/338 |
| 7,023,833 B1 * | 4/2006 | Aiello et al. | 370/348 |
| 7,058,050 B2 * | 6/2006 | Johansson et al. | 370/386 |
| 7,113,536 B2 * | 9/2006 | Alriksson et al. | 375/132 |
| 2002/0036986 A1 | 3/2002 | Haartsen | |
| 2002/0061009 A1 | 5/2002 | Sorensen | |
| 2002/0089927 A1 | 7/2002 | Fischer et al. | |
| 2002/0150145 A1 | 10/2002 | Alriksson et al. | |

FOREIGN PATENT DOCUMENTS

WO 01 41348 A 6/2001

OTHER PUBLICATIONS

Bisdikian, An Overview of the Bluetooth Wireless Technology, IBM Research Report, pp. 1-31, 2001.*

(Continued)

*Primary Examiner*—Frank Duong
(74) *Attorney, Agent, or Firm*—Potomac Patent Group PLLC (57) ABSTRACT

Synchronous and asynchronous data traffic over multipoint ad-hoc telecommunication networks is scheduled in frames, and bandwidth in such networks is allocated based on packet type and traffic type by a scheduler that points to frame descriptors, or data structures, that define where data is located, what packet type to use for the transmission, etc. The scheduling of reception is implicit, viz., there is always a transmit/receive descriptor pair. The same scheduler can schedule traffic in interconnected networks in which there is a participant, even if the networks are unsynchronized to one another, and the scheduler can schedule connection-setup actions, such as page and inquiry. The scheduler can also schedule non-actions, or inactivity, such as "no operation" and "sleep".

18 Claims, 9 Drawing Sheets

OTHER PUBLICATIONS

Miklos et al, Performance Aspects of Bluetooth Scatternet Formation, IEEE, pp. 147-148, 2000.*

Johansson et al, Bluetooth: An Enabler for Personal Area Networking, IEEE, pp. 28-37, 2001.*

Johansson et al, JUMP Mode-A Dynamic Window-based Scheduling Framework for Bluetooth Scatternets, IEEE, pp. 204-211, 2001.*

Frodigh, Magnus, "Wireless *ad hoc* networking—The art of networking without a network", Ericsson Review, vol. 77, No. 4, 2000: pp. 248-263, XP000969933.

Haartsen, Jaap, "Bluetooth—The Universal radio interference for *ad hoc*, wireless connectivity", Ericsson Review No. 3, 1998: pp. 110-117.

* cited by examiner

FLEXIBLE FRAME SCHEDULER FOR SIMULTANEOUS CIRCUIT-AND PACKET-SWITCHED COMMUNICATION

RELATED APPLICATION

This application is related to, and claims priority from, U.S. Provisional Patent Application No. 60/311,273 entitled "Flexible Frame Scheduler for TDMA-Systems" filed on Aug. 9, 2001, the disclosure of which is expressly incorporated herein by reference.

BACKGROUND

This application relates to telecommunication systems having frame scheduling schemes for simultaneous circuit-switched and packet-based communication.

Traditional communication networks often have a hierarchical architecture. A user accesses the network via a source node and is routed through dedicated equipment in the network to a destination node. For example, a wireless, cellular telephone user originates a communication session by dialing the telephone number of a desired destination. The call from the users terminal is received in a base transceiver station (BTS), which passes the call to other nodes in the wireless network and perhaps through a wire-line network to the destination, which may be a terminal in either the wireless or wireline networks. It will be appreciated that the terminals may include voice devices like telephones and data devices like personal computers (PCs), personal digital assistants (PDAs), and other devices capable of transmitting data packets.

Ad-hoc communication networks enable terminals to form direct connections without the assistance of an intervening communication network. Wireless systems that support ad-hoc connections should provide direct communication among any radio units that are in range of one another. Such ad-hoc communication sessions can use the unlicensed industrial, scientific, and medical (ISM) band at 2400 MHz that has been opened for commercial applications, and many commercially available products can provide wireless communications in these bands.

The use of the ISM band is restricted in the United States by Part 15 of the rules of the Federal Communications Commission (FCC) and in Europe by ETS 300 328 of the European Telecommunication Standards Institute (ETSI). Other countries apply similar rules. Briefly stated, the U.S. rules require a user to spread its transmitted power over the frequency band in order to minimize the chance of interference with other users.

Such spreading can be achieved by two techniques known in the art of spread spectrum communication systems. In the frequency-hopping technique, the transmitter emits a carrier signal that is modulated in a conventional way by the information to be sent, and the frequency of the carrier signal is changed (hopped) according to a predetermined pattern that is known to the receiver. GSM-type cellular telephone systems are examples of frequency-hopping communication systems. In the direct-sequence technique, the carrier signal has a fixed frequency and is modulated in a conventional way by a combination of binary data to be sent and a noise-like, higher-bit-rate, binary sequence that is known to the receiver. CDMA-type cellular telephone systems are examples of direct-sequence spread spectrum communication systems.

Figure 1A:
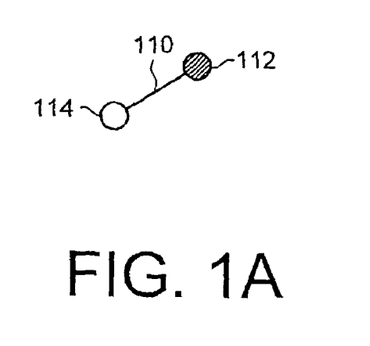
FIG. 1A depicts a point-to-point piconet.
Figure 1B:
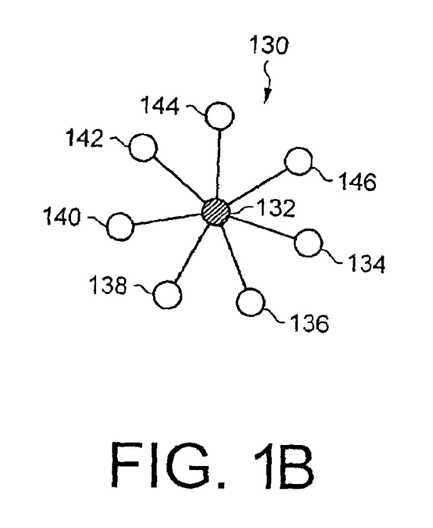
FIG. 1B depicts a point-to-multipoint piconet.

A BLUETOOTH™ wireless communication system operates in the ISM band at 2400 MHz using a fast frequency-hopping scheme to minimize interference with non-BLUETOOTH™ sources. The frequency-hopping occurs nominally at 1,600 hops per second, and the system has 79 possible channels (carriers), with a typical channel spacing of 1 MHz. A BLUETOOTH™ wireless network can carry both synchronous traffic, e.g., voice conversations, and asynchronous traffic, e.g., data packets that follow the Internet protocol (IP). Two or more BLUETOOTH™ (BT) units sharing the same channel form a piconet, two of which are depicted in FIGS. 1A, 1B. Each BT unit in a piconet may perform the functions of either a master or slave, and within each piconet, there is only one master and up to seven active slaves. In FIGS. 1A, 1B, the master unit is indicated by hatching and the slave units are indicated by no hatching. All slave units in a piconet synchronize themselves to the master unit's clock cycle and hopping sequence.

Aspects of BLUETOOTH™ systems are disclosed in this application and in J. Haartsen, "Bluetooth—The Universal Radio Interface for ad hoc, Wireless Connectivity", *Ericsson Review* no. 3, pp. 110-117 (1998); and M. Frodigh et al., "Wireless ad hoc Networking—The Art of Networking without a Network", *Ericsson Review* no. 4, pp. 248-263 (2000), both of which are currently available on the World Wide Web. Aspects of BLUETOOTH™ and other communication systems are described in U.S. patent application Ser. No. 09/454,758 filed on Dec. 6, 1999, by P. Johansson for "System and Method for Scheduling Communication Sessions in an ad-hoc Network"; Ser. No. 09/455,172 filed on Dec. 6, 1999, entitled "Batched Fair Exhaustive Polling Scheduler"; Ser. No. 09/834,911 filed on Apr. 16, 2001, by F. Alriksson et al. for "Rendezvous Point Interpiconet Scheduling (RIPS)"; Ser. No. 09/852,114 filed on May 9, 2001, by J. Haartsen for "Method and Apparatus for Managing Traffic Flows"; and Ser. No. 09/952,707 filed on Sep. 14, 2001, by J. Sorensen for "Administrative Domains for Personal Area Networks". Further information about BLUETOOTH™ systems is available at http://www.bluetooth.org.

The specifications of BLUETOOTH™ communication systems support both point-to-point and point-to-multipoint network connections. Referring again to FIG. 1A, piconet 110 is a point-to-point piconet, with a master node 112 and a single slave node 114. In FIG. 1B, piconet 130 is a point-to-multipoint piconet, with a master node 132 and seven slave nodes 134-146.

Figure 2:
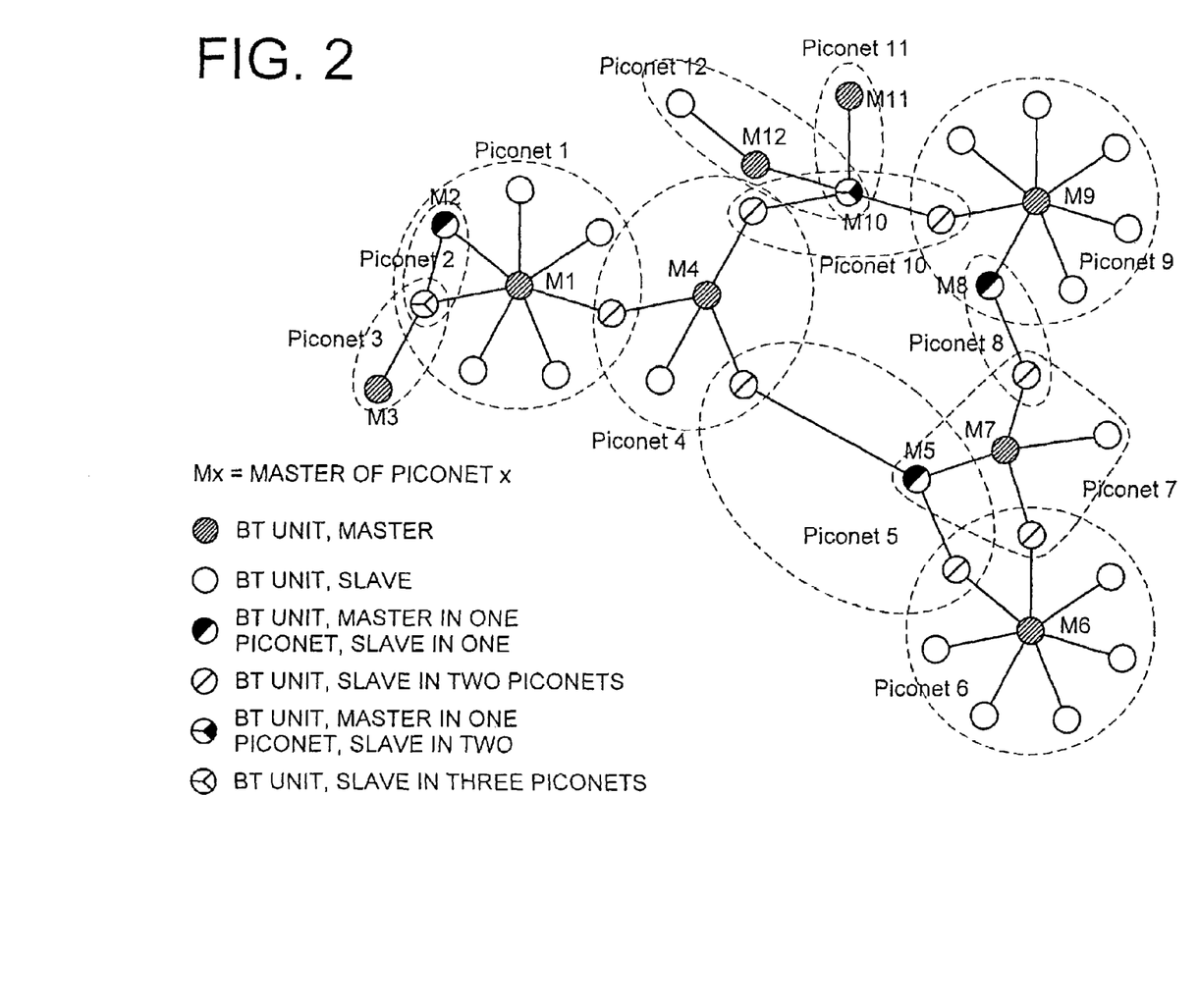
FIG. 2 depicts a scatternet that includes a plurality of piconets.

Two or more piconets can be interconnected, forming what is called a scatternet. Since each piconet includes a master or supervisory unit that generally has its own clock timing and frequency hopping scheme, piconets interconnected in a scatternet are generally independent and unsynchronized. A node that is the interconnection point between two piconets is a BT unit that is a member of both piconets. A BT unit can be a slave unit in any number of interconnected piconets and a master in only other interconnected piconet. This is depicted in FIG. 2, which shows a scatternet comprising twelve interconnected piconets 1-12. BT units M1, M3, M4, M6, M7, M9, M11, M12 act as only master units in their respective piconets 1, 3, 4, 6, 7, 9, 11, 12 and are depicted as hatched circles. BT units M2, M5, M8 act as master units in their respective piconets 2, 5, 8 and as slave units in only one other piconet (piconets 1, 7, 9, respectively) and are depicted as half-darkened circles. BT unit M10 acts as a master unit in its respective piconet 10 and as a slave unit in two other piconets 11, 12 and is depicted as a one-third-darkened circle. In FIG. 2, circles indicating slave units are similarly divided to illustrate the number of piconets to which the respective unit belongs.

A BLUETOOTH™ system provides full-duplex communication by slotted time division duplex (TDD), in which each slot is 0.625 millisecond (ms) long. The time slots are numbered sequentially using numbers in a very large range (i.e., cycling through a range of $2^{27}$). Master-to-slave transmission starts in an even-numbered time slot and slave-to-master transmission starts in an odd-numbered time slot. An even-numbered time slot and its subsequent odd-numbered time slot (i.e., a master-to-slave time slot and a slave-to-master time slot, except when packets needing multiple slots are used) together are called a frame. There is no direct transmission between slaves in a BLUETOOTH™ piconet; all communication takes place between master and slave nodes.

Communication within a piconet is organized such that the master polls each slave according to a polling scheme. A slave typically transmits after being polled by the master, with minor exceptions described below. The slave starts its transmission in the slave-to-master time slot immediately following the packet (slot) received from the master. The master may or may not include data in the packet used to poll a slave. An exception to this principle is that when a slave has an established synchronous connection-oriented (SCO) link, which is described further below, the slave may continue to transmit in the slave-to-master time slot that has been reserved by the master, even if it is not explicitly polled by the master in the preceding master-to-slave time slot.

A globally unique, 48-bit address according to the IEEE 802 specification is assigned to each BT unit when it is manufactured, and this address, called the Bluetooth Device Address (BD_ADDR), is never changed. In addition, the master BT unit of a piconet assigns a local Active Member Address (AM_ADDR) to each active member of the piconet. The AM_ADDR is a three-bit media-access-control (MAC) address assigned and cleared dynamically, and is unique only within that piconet. The master uses AM_ADDRs when polling slaves in a piconet, and when a slave transmits a packet to the master in response to a packet received from the master, the slave includes its own AM_ADDR in the packet header, not the master's AM_ADDR.

All data is transmitted as packets, which can carry both synchronous data on SCO links and asynchronous data like IP packets on asynchronous connection-less (ACL) links. SCO links support symmetrical, circuit-switched, point-to-point connections typically used for voice, and these links are defined on the frequency-hopping channel by reservation of pairs of consecutive (forward and reverse) slots, i.e., frames, at fixed intervals. ACL links support symmetrical or asymmetrical, packet-switched, point-to-multipoint connections typically used for bursty data transmissions. An acknowledgment and re-transmission scheme is used for ACL-link packets to ensure reliable transfer of data. Forward error correction (FEC) coding may also be used.

Figure 3:
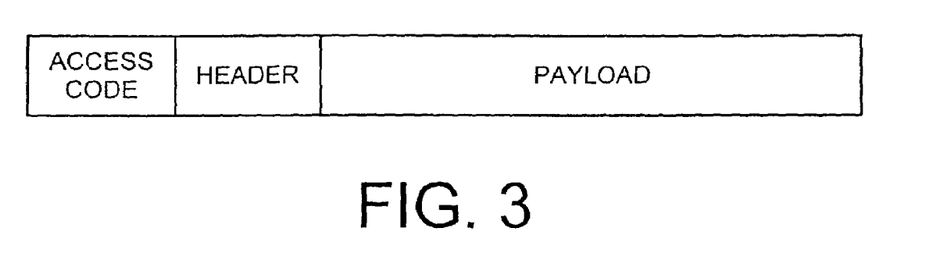
FIG. 3 depicts a format of a data packet.

A standard format of a BLUETOOTH™ packet is illustrated in FIG. 3 and includes an access code, header, and payload, although some packets may use different formats. The access code is a 72-bit sequence that is derived from a master's identity by each slave in a piconet and is unique for the channel; every packet exchanged on a channel includes the respective access code. Receivers on a piconet compare the access code of a received packet to the expected access code, discarding the packet if the codes do not match. The AM_ADDR is located in the header, which is a 54-bit sequence that also includes various control parameters, e.g., a bit indicating an acknowledgment or a re-transmission request of the previous packet, and a header error check (HEC). The format of the payload, comprising 0-2745 bits, depends on the type of packet. The payload of a typical ACL packet includes a header, a data field, and a cyclic redundancy check (CRC); AUX1-type ACL packets have payloads arranged differently. The payload of a typical SCO packet includes only a data field. Besides ACL and SCO packets, there are hybrid packets that each include two data fields, one for synchronous data and one for asynchronous data. Packets in which the payload does not include a CRC are neither acknowledged nor re-transmitted.

The master unit of a piconet schedules the traffic in the piconet through its polling of the slave units. This is called intrapiconet scheduling in this application. In a scatternet, at least one BT unit is a member of more than one piconet, so scheduling the presence of this node, which may be called an interpiconet node, in its different piconets is a complex task in view of the need to handle circuit-switched (synchronous) data and packet-switched (asynchronous) data with varying packet sizes. This is called interpiconet scheduling in this application.

To schedule scatternet traffic efficiently, the BT units scheduling traffic within their respective piconets should consider the scheduling of traffic between the piconets in their polling of the slaves of their piconets. For instance, an intrapiconet scheduler in a master unit might not schedule an interpiconet node when the latter is active in another piconet and it might schedule the interpiconet node more often when the latter is again active in its piconet.

The complexity of such scheduling can easily overwhelm the processing resources available in the master units for performing the scheduling function. If a master unit's central processing unit (CPU) must deal with scheduling each individual packet, the CPU can become too heavily loaded by the necessarily large number of interrupts. In addition to scheduling transmission and reception, the scheduler must control paging for new piconet nodes, inquiry scans, and page scans, which are operations specified in BLUETOOTH™ communication systems that have counterparts in other communication systems.

SUMMARY

Applicants' invention mitigates these problems and facilitates scheduling synchronous and asynchronous data traffic over a multipoint telecommunication network, where action in each frame is scheduled, and allocating bandwidth in such a network based on packet type and traffic type, e.g., synchronous packets, asynchronous packets, "connection setup" packets, "no operation" packets, etc.

The scheduler points to descriptors, or data structures, that define where data is located, what packet type to use for the transmission, etc. The scheduling of reception is implicit, viz., there is always a transmit/receive descriptor pair. The same scheduler can schedule traffic in all networks (piconets) in which there is a participant, even if the networks are unsynchronized to one another, and the scheduler can schedule connection-setup actions, such as page and inquiry. The scheduler can also schedule non-actions, or inactivity, such as "no operation" and "sleep".

In one aspect of Applicants' invention, a device for scheduling connection actions to be taken within a frame by a communication device that is a member of at least one ad-hoc network includes a scheduling means for scheduling the connection actions to be taken by a processor in a certain frame. The scheduling means includes at least one frame descriptor arrangement stored in a memory responsive to the processor and the frame descriptor arrangement includes at least one frame descriptor arranged in the descriptor arrangement according to a predetermined schedule. The frame descriptor includes a set of parameters describing the connection actions to be taken in a certain frame when said descriptor is selected according to an iterative pointer.

In this way, the plurality of frame descriptors are organized as a succession of superframes that each include a number of frame descriptors determined by a selectable parameter.

A frame descriptor may also include a parameter that indicates a transmit power for the respective frame of information, and each network descriptor includes a parameter that indicates whether the communication device is a master or a slave, a parameter that indicates signal timing in the communication network, and a frame-start-timing parameter that defines a frame offset, with respect to the communication network, for a slave in another communication network that is unsynchronized with the communication network. Each network descriptor may then further include a correlation-window-size parameter for synchronizing the communication network and compensating for timing drift.

Each transmit descriptor defines properties of a frame to be transmitted on an asynchronous connection-less ("ACL") communication link and includes a packet-type parameter that indicates a type of frame to send; a payload-header-content parameter that indicates a content of a payload header; a data pointer that points to at least one location in the memory where information to be transmitted in the frame is stored; a bytes-remaining parameter that indicates a number of bytes of information that remain to be transmitted; and a start command. Each receive descriptor defines properties of a frame received on an ACL communication link and includes at least one data pointer that points to a respective location in the memory for storing received information. Each voice descriptor defines properties of a synchronous connection-oriented ("SCO") communication link that are significant for transmission and reception of voice data and includes parameters that indicate voice packet type, voice interface type, air interface encoding, voice data buffer pointer, and voice data length.

A frame descriptor may also include a PCM descriptor that defines properties of a pulse-code-modulation ("PCM") interface associated with a voice descriptor in the frame descriptor, and information to be transmitted and information that has been received may include voice information that is stored in at least one circular buffer in the memory.

BRIEF DESCRIPTION OF THE DRAWINGS

The invention will be understood by reading this description in conjunction with the drawings, in which.

DETAILED DESCRIPTION

For a single BLUETOOTH™ piconet, the task of providing a controlled bit rate and delay for traffic to and from the slave units is managed by the master unit alone with a scheduler located in the master unit. The scheduler preferably handles such intrapiconet scheduling so as to ensure an efficient, fair distribution of the piconet's bandwidth. Interpiconet scheduling for a scatternet is also preferably scheduled to ensure an efficient, fair distribution of available bandwidth. Suitable schedulers and polling algorithms are described in commonly assigned U.S. patent application Ser. No. 09/454,758 and Ser. No. 09/455,172 that are cited above and that are incorporated here by reference.

Figure 4A:
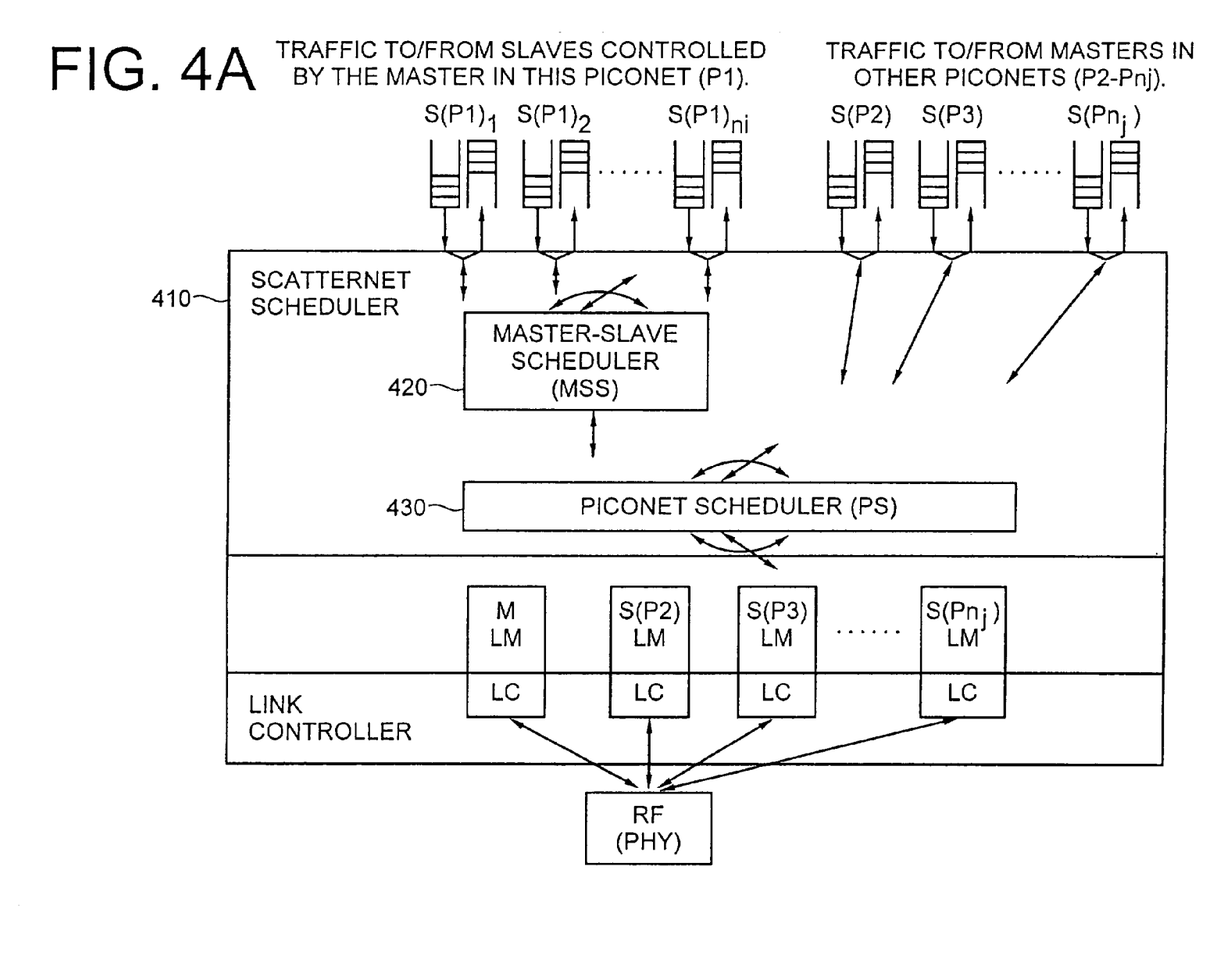
FIGS. 4A, 4B depict a scatternet scheduler.

Similar to application Ser. No. 09/454,758, FIG. 4A depicts a scatternet scheduler 410 in a BT unit that includes a master-slave scheduler (MSS) 420, which is active only when the BT unit is a master node, and a piconet scheduler (PS) 430, which is active when the BT unit is either a master or a slave. FIG. 4A depicts the BT unit acting as the master node in one piconet P1 and as a slave node in each of piconets P2-Pn$_j$. MSS 420 handles packet scheduling for the downlink from the master to the slaves S$_1$ ... S$_{mi}$ in piconet P1 during time periods when the BT unit acts as the master in piconet P1. In other words, the MSS 420 performs intrapiconet scheduling. The MSS 420 is based on relative timing according to a suitable intrapiconet scheduling algorithm such as that described above.

The PS 430 identifies the time periods during which the BT unit is active as a master in piconet P1 and as a slave in one or more of piconets P2-Pn$_j$. In other words, the PS 430 also performs intrapiconet scheduling, controlling the flow of traffic to link managers and controllers (LMs and LCs) and the physical radio channel. The PS 430 may be based on absolute timing, identifying for each time slot whether to invoke a certain slave or master, determining for how much time (or how many time slots or frames) the respective slave or master has access to the communication channel, and scheduling the next interval during which the slave or master will be active. During time periods between active periods, a BT master-slave pair may put themselves in a power saving mode, e.g., Park, Hold, or Sniff.

Figure 4B:
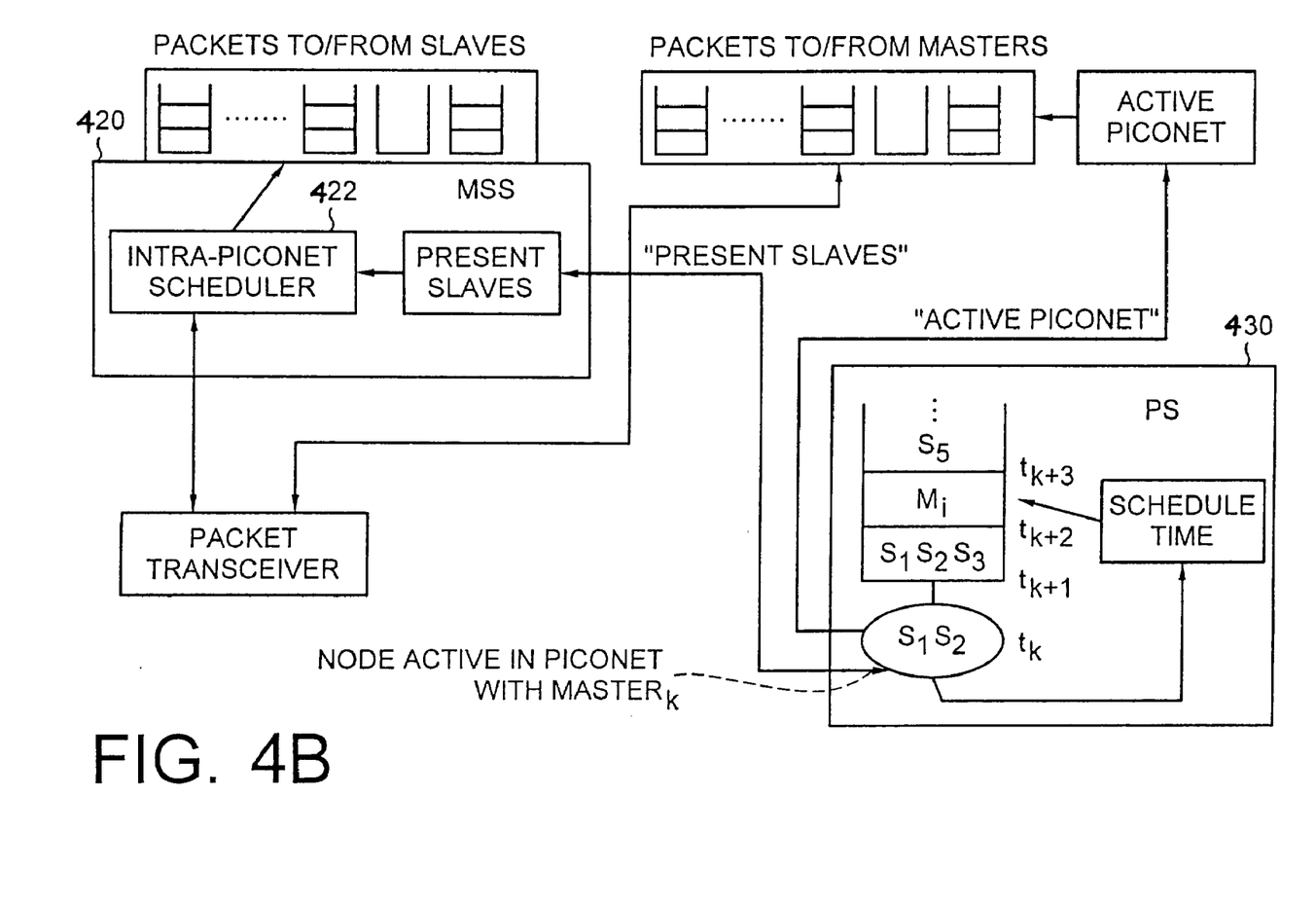

FIG. 4B depicts the MSS 420 and PS 430 of FIG. 4A in more detail. In the MSS 420, slave nodes that are present in the piconet in which the node that includes the MSS 420 is master are scheduled by an intra-piconet scheduler 422 that implements a suitable scheduling algorithm (e.g., the B-FEP algorithm). Slave nodes are pointed out to the scheduler 422 by the PS 430, which is to say that slave nodes are put into a list of "present" or active slaves that are eligible for polling by the master unit. The scheduler 422 accesses the list of present slaves for use by its scheduling algorithm in the course of performing intrapiconet scheduling. As a result of operation of the scheduling algorithm, data packets are provided to the packet transceiver for transmission to the respective slave units in appropriate time slots. The slaves scheduled as present in piconet P1 may be inactive in terms of data transfer, however, and therefore are defined as inactive by the intrapiconet scheduling algorithm The PS 430 controls the time points $t_k$, $t_{k+1}$, $t_{k+2}$, ... at which a node (whether a master M$_i$ or slave S$_i$) becomes active in one of a plurality of respective piconets P$_i$. FIG. 4B depicts the PS 430 as including a list or array of such time points, and this list is accessed by the PS 430 in scheduling the starting point and duration of a node's activity with other nodes. It will be noted that the PS 430 may schedule several slaves as becoming active, or present in a piconet, at the same time, when they belong to the same piconet; FIG. 4B depicts slaves $S_1$, $S_2$ present in the same slot $t_k$ and slaves $S_1$, $S_2$, $S_3$ present in the same slot $t_{k+1}$.

As noted above, the complexity of such scheduling can easily overwhelm the processing resources available in the master units for performing the scheduling function. With Applicants' invention, transmission of synchronous or asynchronous packets, like SCO or ACL packets, can be scheduled with very limited software intervention. Applicants' invention also facilitates scheduling connection-setup actions, like Inquiry, Inquiry Scan, Page, and Page Scan, and power-saving actions, like Park mode, Sniff mode, and Sleep mode.

Applicants' invention does this by recognizing that the fundamental scheduling problem, i.e., when will a unit send or receive information from another unit, can be separated from the schedule-implementation problem, i.e., how will a unit send or receive information from another unit according to a given schedule. Thus, the scheduling problem can be solved by a (higher level) processor that implements and can be optimized for a scheduling algorithm suitable to the telecommunication system, such as those described in FIGS. 4A, 4B and the U.S. patent applications cited and incorporated by reference above, and the schedule-implementation problem can be solved by a (lower level) processor that implements and can be optimized for the techniques described below.

Figure 5:
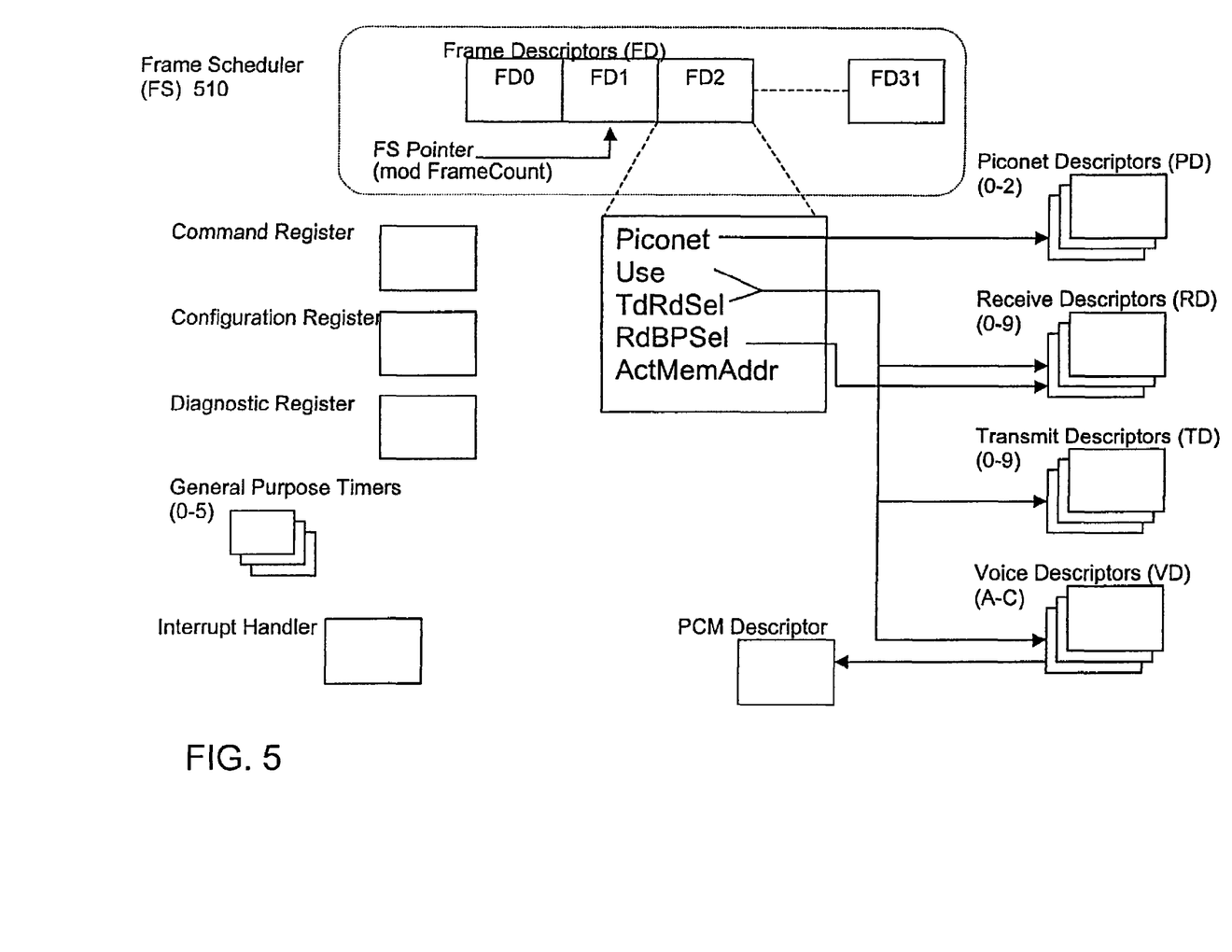
FIG. 5 depicts a scheduler in accordance with Applicants' invention.

Referring to FIG. 5, a frame scheduler (FS) 510 in accordance with Applicants' invention is preferably implemented in a (lower level) processor that handles a number of supporting data structures, which may include hardware, software, and hybrid structures like command, configuration, and diagnostic registers, timers (six indicated by indices 0-5 are shown in FIG. 5), an interrupt handler, and a number or descriptors (described in more detail below) that are advantageously implemented as state machines. In particular, the FS 510 selects and operates according to a number of frame descriptors (FDs) FD0, FD1, . . . , FDx that are arranged in time according to a schedule provided by a (higher level) processor and that are indicated by a pointer (FS Pointer). The contents of these data structures define the actions to be taken in each frame by the processor that implements the FS 510; each FD can thus be considered as selecting a network descriptor and a transmit/receive descriptor pair (described in more detail below). It will be appreciated of course that the FS 510 can be implemented by the same processor that implements the fundamental scheduling algorithm.

The FS 510 advantageously can set up a predefined pattern of events, e.g., a superframe, that has a length, e.g., the number of frames or FDs in the superframe, that is configurable by software control of a FrameCount parameter. FIG. 5 depicts an arrangement of thirty-two FDs, and the FS Pointer would be iterated to indicate each FD in a superframe in turn. Some of the advantages of handling frames in this way are that a BT unit's power consumption can be reduced in a tradeoff between data communication latency and processor power consumption and that bandwidth can be more readily allocated. For each frame, the respective FD includes a set of parameters that describes the use of that frame.

The parameters typically included in an FD are a network or piconet descriptor (PD), which identifies the network used for the respective frame (in a BLUETOOTH™ system, the piconet used); a use parameter, which indicates an action (e.g., send/receive ACL packets; send/receive SCO packets; do Inquiry, Page, Sleep, etc.; slave member address (when master)) to take in the respective frame; an active member address ActMemAddr, which indicates the address of the slave to which this frame should be sent; TD and RD selector parameter TdRdSel, which selects transmit descriptors (TDs) and receive descriptors (RDs) to be used for transmission and reception; and an RD for broadcast packets select parameter RDBPSel, which defines the properties of a received broadcast packet (this is needed in systems like a BLUETOOTH™ system that use a different RD when broadcast packets are received).

An FD may also include an Other parameter, which indicates functions other than those already described. An example of an Other parameter is an indicator of transmit power, which can be used to implement a transmit power control scheme. It will be appreciated that the Other parameter is not limited to transmit power control but can also be used for other functions, such as controlling radio components like a frequency synthesizer, resetting a sequence number for an ACL link, etc. It may be noted that FIG. 5 does not depict Other for FD2 simply for convenience. It will be understood that RDBPSel may be simply an alternative pointer to an RD for Other kinds of traffic.

A PD defines the properties of a network (e.g., a BLUETOOTH™ piconet) in which the node that includes the scheduler takes part, and preferably includes a parameter that indicates whether the node is a master or a slave in this network. Accordingly, there can be several PDs that can be identified by a respective index value; FIG. 5 depicts an example in which the index ranges from 0 to 2. A PD also preferably includes a parameter that indicates network timing, e.g., a network timing counter for a BLUETOOTH™ piconet that can be used for hop-frequency calculations. A PD also can include a frame-start-timing parameter that is used to define a frame offset, with respect to this network, for a slave node in a piconet that is unsynchronized with this network. The frame-start-timing parameter, which is discussed in more detail below, would typically be continually updated during a connection from time to time (e.g., once per frame) as a result of the ad-hoc, unsynchronized nature of the piconets.

A PD also preferably includes a correlation-window-size parameter that can be useful in synchronizing and re-synchronizing networks that may drift away from an original timing during frames of inactivity, like Park or Hold. For example, a correlation window can be larger than one frame, and the hop-frequency can be determined from the center frame if the correlation window is longer than one frame. A PD also includes an access-code parameter that indicates or is the access code used in this network, and a member-address parameter that indicates the member address of this node in this piconet if this node is a slave node.

A TD is part of a transmit interface, defining the properties of packets to be transmitted on an ACL link, and is set up by software for each ACL data chunk to be transmitted on that ACL link. It will be understood that a data chunk is simply a data aggregation residing in registers or other memory devices in the BT unit. Each chunk to be sent has a size that is convenient for handling by the processors and memory, and it is currently believed that a size in the range of about 200 bytes to about 800 bytes is a convenient for data chunks. For speed purposes, a data chunk is advantageously stored in or fetched from random-access memory (RAM) by direct memory access (DMA). A fetched data chunk to be sent is apportioned by the (low level) processor among one or more packets for transmission, and a stored data chunk that has been received is re-assembled from the received packet(s). (In a BLUETOOTH™ system, each packet carries up to 339 bytes of a data chunk.) Operating in this way results in a very low processing load on the BT unit's processor(s) because each packet that is transmitted or received does not typically interrupt the processor(s) other operations. Instead, interrupts typically occur only upon completion of sending or receiving data chunks.

Thus, it will be understood that a TD typically includes a packet-type parameter that indicates the type of ACL packet to send; a payload-header-content parameter that indicates the content of the payload header, i.e., the number of bytes in the payload and flow bit; a data pointer that points to the memory location(s) of payload data (a data chunk) to be transmitted next; a bytes-remaining parameter that indicates the number of bytes that remain to be transmitted in this data chunk; and a start command.

An RD is part of a receive interface, defining the properties of packets to be received on an ACL link and how to handle packets received on an ACL link. An RD typically includes one or more data pointers that point to respective memory locations in the node for the received payload(s) (a re-assembled data chunk). Accordingly, there can be several RDs (and TDs) that can be identified by respective index values; FIG. 5 depicts an example in which the indexes range from 0 to 9.

A VD defines the properties of an SCO link that are significant for transmission and reception of voice data. In a BT system and other communication systems, voice data comprises pulse-code-modulated data that may arrive at a node through a dedicated serial PCM interface. As with ACL data chunks, voice data is advantageously stored in buffers in RAM (although voice buffers are preferably circular) and is transferred in and out of RAM by DMA and apportioned among packet(s) to be transmitted or re-assembled from packet(s) received. It will be appreciated that the node may handle several types of voice packets according to the particular communication system in which it is a part. For example, a BT master can have up to three active voice channels to different slaves, and thus FIG. 5 depicts an exemplary index having values A, B, C for identifying respective VD, with VD(A) taking care of voice traffic for one slave, VD(B) taking care of voice traffic for another one of the slaves, and VD(C) taking care of voice traffic for the third one of the slaves. As with ACL links, operating in this way results in a very low processing load on the BT unit's processor(s) because each packet that is transmitted or received does not typically interrupt the processor(s) other operations.

A VD advantageously includes parameters that indicate voice packet type, voice interface type (e.g., PCM, RAM), air interface encoding, voice data buffer pointer, and voice data length. With regard to voice interface type, some communication systems support multiple types, for example, raw PCM data and/or RAM. If the voice interface type is PCM, then another descriptor, a PCM Descriptor, is advantageously included that defines the properties of the PCM interface, e.g., PCM master or slave, PCM timing, etc.

Among the merits of Applicants' invention are that the software load in each network node is reduced and that complex frame scheduling is performed in a controlled and elegant way. One scheduler can handle all types of actions within a frame (asynchronous data transfer (i.e., ACL), synchronous data transfer (i.e., SCO), page, inquiry, scan, etc.), and the scheduler minimizes software interrupts. Rather than being interrupted at each frame to set up packet transfer in each frame, Applicants' scheduler enables packet transfer to continue for many frames, requiring an interrupt only when a new TD must be set up or the RD is full. Moreover, if a packet type is longer than one frame, the TDs and RDs for those frames can use the scheduler information from the first frame. Applicants' scheduler can also schedule transitions to and from power-saving modes of operation if available, and it can schedule traffic in a number of simultaneously running, unsynchronized networks.

Figure 6:
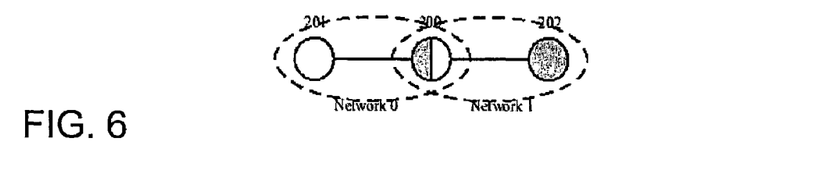
FIG. 6 depicts a scatternet.
Figure 7:
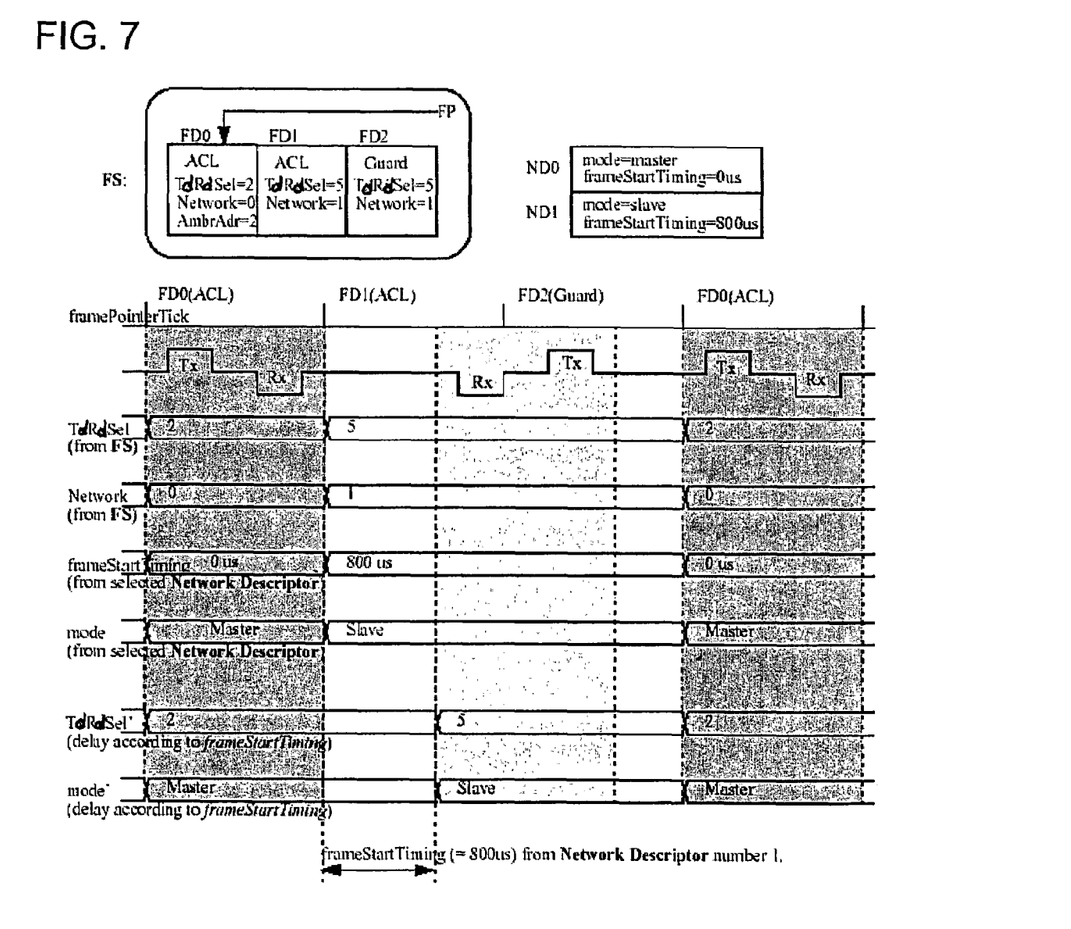
FIG. 7 depicts the operation of a scheduler in accordance with Applicants' invention.

FIGS. 6 and 7 illustrate one example of how the scheduler 510 can be used for scheduling traffic on two networks 0, 1 (piconets) depicted in FIG. 6. A BT unit 200 is the master in network 0 and is a slave in network 1, and is depicted as a half-hatched circle. A BT unit 201 is a slave in network 0, and is depicted by an unhatched circle, and a BT unit 202 is the master in network 1, and is depicted by a hatched circle. This example focusses on the operation of a frame scheduler in BT unit 200.

Referring to FIG. 7, the FS Pointer (FP) is iterated in response to a framePointerTick strobe, selecting a new FD; FIG. 7 depicts the selection of FD0. As described above, network-related information, like a frameStartTiming indicator and a mode (Master/Slave) indicator, is stored in the PDs identifying the network(s), and thus a PD shown as ND0 contains information about network 0, and a PD shown as ND1 contains information about network 1. In this example, network 1 is asynchronous to network 0, and the timing difference between these networks is given by frameStartTiming, which is stored in the PD ND1. In this example, the frameStartTiming indicator is currently set to 800 microseconds (µs), and this indicator is continually updated with suitable hardware and/or software to follow the timing of the master BT unit 202.

The data to/from the slave(s) in network 0 (i.e., BT unit 201 in this example) is described in TD2 and in RD2. The data to/from the master in network 1 (i.e., BT unit 202 in this example) is described in TD5 and RD5. TxRxSel' is TxRxSel from the scheduler delayed according to the selected frameStartTiming indicator, and Mode' is Mode from the selected PD delayed in the same way. TxRxSel' thus selects which TD and RD to be used in the current frame, and mode' defines this frame as either a master frame or a slave frame. It can be seen from FIG. 7 that an FD is not limited to indicating an ACL link or an SCO link but is advantageously capable of implementing a guard time for accommodating time shifts between networks, e.g., the piconets of a scatternet.

It will be appreciated that a scheduler in accordance with Applicants' invention can be used in all time-slotted communication systems in which predefined patterns of events, e.g., superframes, are used. Moreover, Applicants' invention enables the use of a flexible programmable superframe structure, without excessively increasing the processing load on a CPU in a network node.

Figure 8:
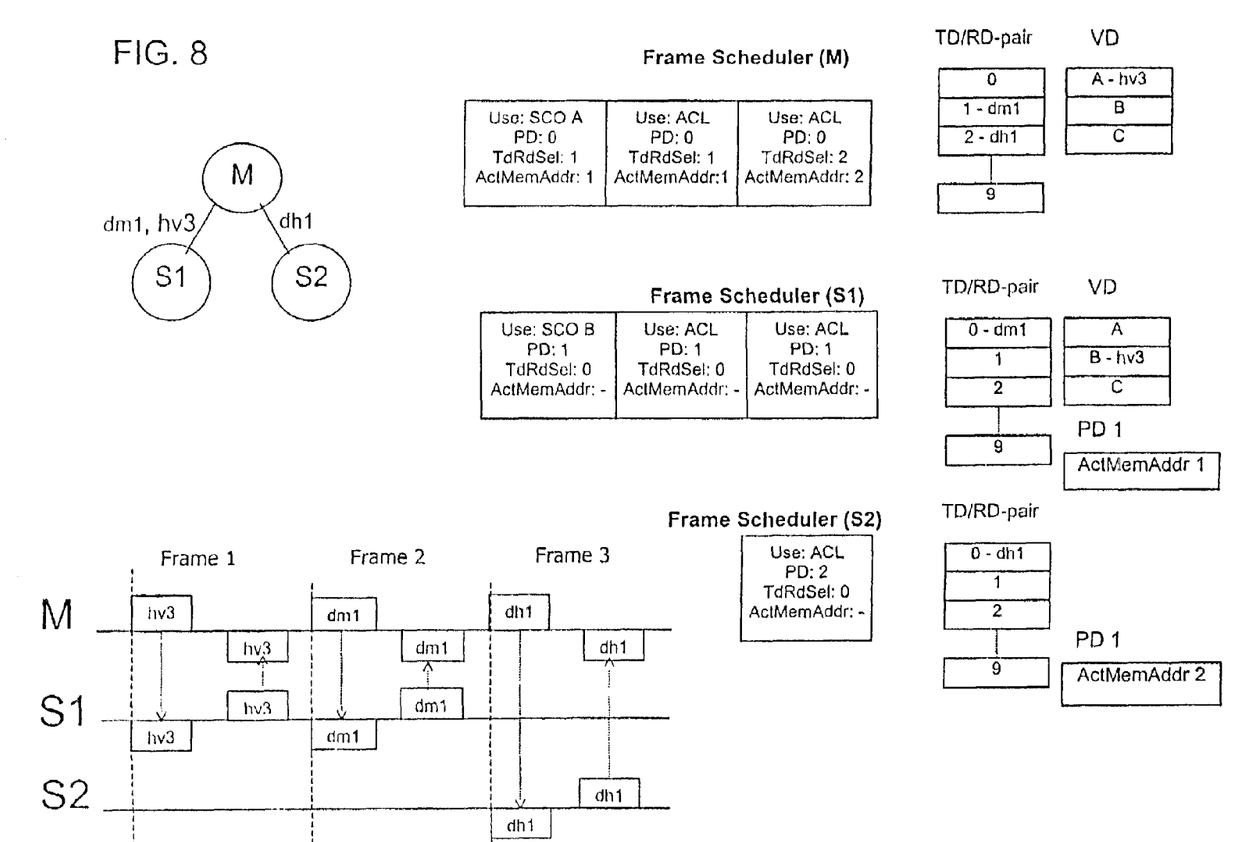
FIGS. 8 and 9 depict examples of descriptor usage in accordance with Applicants' invention.

To explain further the features and advantages of Applicants' invention, FIG. 8 depicts a scheduling example in a network comprising one master node M and two slave nodes S1, S2. In this example, the slave node S1 is connected to the master M through both an SCO channel and an ACL channel, and the slave node S2 is connected to the master M through only an ACL channel. The FS and descriptors are set up in the nodes M, S1, and S2 accordingly, with FIG. 8 depicting a sequence of three FDs for the master M, a sequence of three FDs for the slave S1, and one FD for the slave S2. To the right of the FDs in FIG. 8 are depicted TD/RD-pair stacks and VD stacks for the three nodes. Also depicted in FIG. 8 are the three communication frames 1, 2, 3 that show the temporal pattern of alternating transmissions by the nodes M, S1, and S2, with frame boundaries being indicated by dashed lines.

In FIG. 8, the first FD of the Frame Scheduler in the master node M programs an SCO slot, as a suitable "SCO" indicator is entered in the "Use" field of the FD; in this example, voice channel A is indicated, and the packet type hv3 is entered in the VD stack position "A". Thus, the FD effectively points to this position in the VD stack of node M, and frame 1 in the transmission pattern shows an hv3-type packet sent from node M to node S1 and then an hv3-type packet sent from node S1 to node M. It will be understood that in an SCO frame, the TdRdSel parameter must point to an existing TD/RD pair (in other words, a master node or a slave node must be prepared to receive ACL packets in an SCO frame), and thus the TdRdSel parameter of the first FD indicates TD/RD pair 1 for reasons that will be clear from the description below.

Since a synchronous hv3-type packet is sent/received every third frame, the Frame Scheduler length is conveniently set-up at three frames (corresponding to six BT slot lengths as can be seen from the transmission pattern in FIG. 8), and thus the same FD will be used with a period of three frames. In this example, the second and third FDs of the FS in node M are ACL channels, and consequently "ACL" is entered in their respective "Use" fields and no entries are made in the other positions (i.e., B, C) in the VD stack.

As explained above, the FDs also indicate the networks used for communication, with network properties like timing and access code being entered in the PDs. In this example, Piconet (network) 0 is used by node M for all communication, so this is indicated in the PD fields of the FDs.

Also as explained above, every FD points at a TD/RD pair through the TdRdSel field. The master node M associates every master-slave ACL link with a TD/RD pair. In this example, the second and third FDs in each frame are used for ACL packet transfer, and TD/RD-pair 1 is associated with S1 (i.e., the second FD has TdRdSel=1) and TD/RD-pair 2 is associated with S2 (i.e., the third FD has TdRdSel=2). As shown in FIG. 8, the TD/RD pairs indicate the packet types, and thus TD/RD-pair 1 indicates packet type dm1 and TD/RD-pair 2 indicates packet type dh1, and the transmission pattern shows dm1-type packets exchanged by nodes M and S1 in frame 2 and dh1-type packets exchanged by nodes M and S2 in frame 3.

Since node M is a master node, the ActMemAddr fields in its FDs must be defined. In this example, the address of S1 is 1 and the address of S2 is 2, so these values are entered in the ActMemAddr fields of the second and third FDs. The first frame is used for SCO traffic with slave 1, so member address 1 is entered in the ActMemAddr field of the first FD.

The FDs of the slave nodes are set up in a similar way as the master node, although there are minor differences. For example, the member address of a slave is entered in the PD fields of the slave's FDs; in the example depicted in FIG. 8, PD 1 is used in the FDs of both S1 and S2. Similarly, the ActMemAddr field is set to 1 in the master node and is not set in FDs of the Frame Schedulers of the slave nodes S1, S2 in the example depicted in FIG. 8.

SCO-frame timing in a slave node must be synchronized with the frame timing in the master node (viz., the frame boundaries in the time domain must match up), and that synchronization is typically handled as part of the SCO channel set-up procedure. In FIG. 8, VD B is used as a convenient place to store the properties of the SCO channel (and thus the Use field of the first FD of node S1 indicate SCO B). In this example, the master node M also communicates with the slave node S1 with ACL packets (according to the second FD), but it will be understood that the node S1 normally does not know when this communication will take place since the communication is asynchronous and thus could occur in either of the two remaining frames 2, 3. Consequently, both remaining FDs for the FS in node S1 are set up as ACL frames, pointing to TD/RD-pair 0 (i.e., TdRdSel=0), and that entry in the TD/RD-pair stack indicates the appropriate packet type, which is dm1 in this example. It will be understood that the slave node must typically be prepared to receive ACL packets of any type in a master-to-slave slot and that in the example depicted in FIG. 8, only single-slot packets are assumed.

As for the slave node S2, the master node M in this example uses only ACL communication with it, and the member address is set to 2 in the PD field. As noted above for node S1, the slave S2 does not know when ACL communication will occur, and in the absence of SCO communication, ACL communication can thus occur in any frame. Consequently, a single FD can be programmed in the FS of node S2 that points to a TD/RD pair (TD/RD-pair 0, in this example), and that entry indicates the appropriate packet type. In this example, dh1-type packets are indicated, and these are used when the slave has data to transmit.

It will be appreciated that if a master or slave node runs out of data to transmit, then POLL or NULL packets are sent instead of data packets in frames where ACL packets are scheduled for transmission. It will also be appreciated that a slave node may receive broadcast packets, and reception of such packets is handled with a separate RD that defines for example where the received broadcast payload shall be stored.

Figure 9:
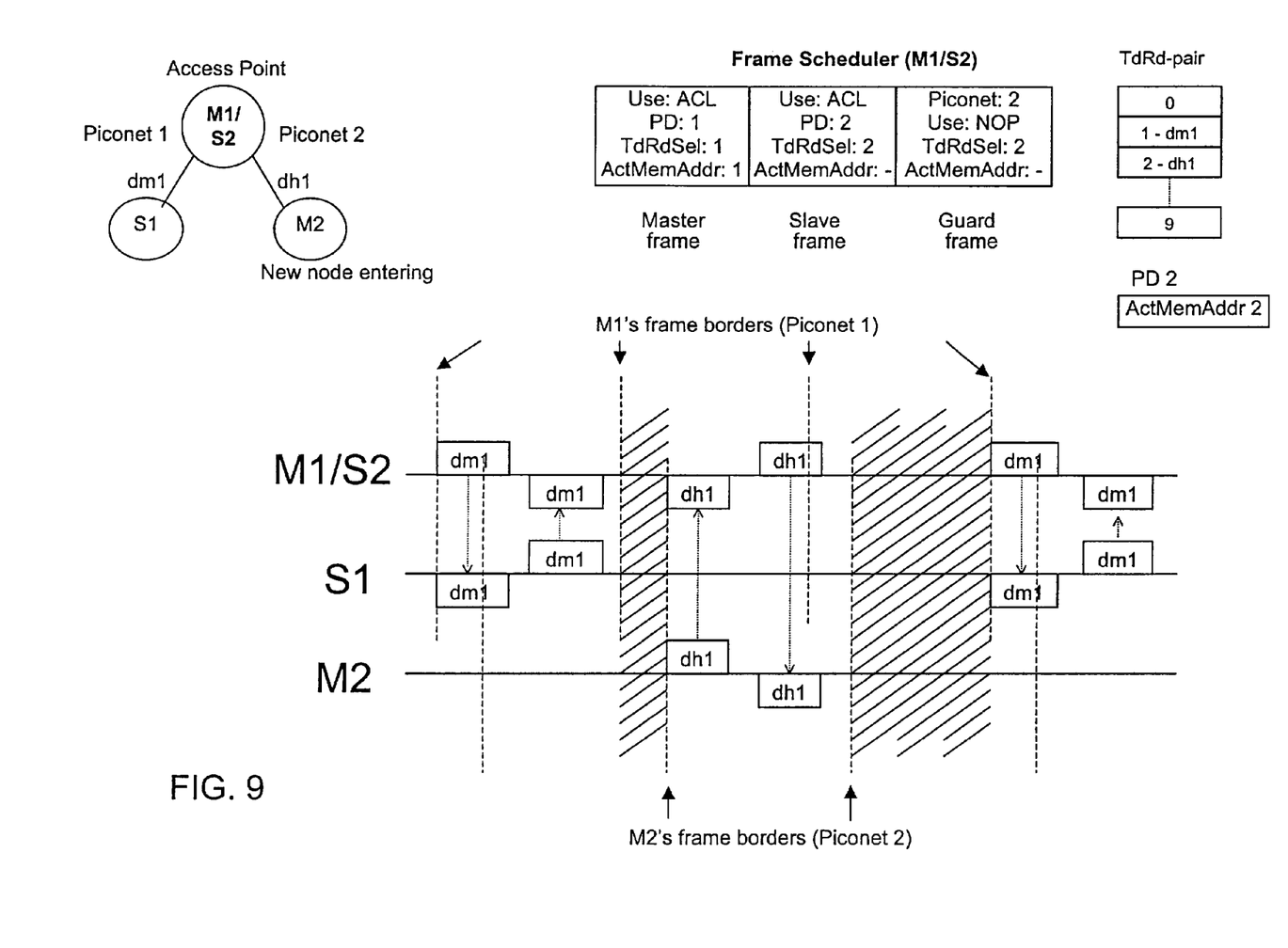

To explain even further the features and advantages of Applicants' invention, FIG. 9 depicts a scheduling example in which one node, which may be called an access point, participates in two piconets 1, 2. In other words, FIG. 9 depicts a scatternet. In its role as a master node M1, the access point connects a slave node S1 in piconet 1. In its roles as a slave node S2, the access point is connected to the master node M2 in piconet 2. In the example depicted in FIG. 9, these connections are set up as ACL channels, and the FSs with their FDs and stacks are set up in the access point and nodes S1 and M2 accordingly as described above. FIG. 9 depicts a sequence of three FDs for the access point M1/S2, with its TD/RD-pair stack and PD. (A VD stack is not shown because this example considers only ACL channels.) Also depicted in FIG. 9 is a sequence of communication frames in the piconets 1, 2 that shows the temporal pattern of alternating transmissions by the nodes M1/S2, S1, and M2, with frame boundaries in the two piconets being indicated by dashed lines.

The access point node M1/S2 needs to switch between piconet 1, its master piconet, and piconet 2, its slave piconet. In this example, the first frame is shown as a master (piconet 1) frame, the second frame is shown as a slave (piconet 2) frame, and the third frame is shown as a master (piconet 1). Since the two piconets are not synchronized to each other, there is a suitable guard period between adjacent frame boundaries of piconets 1, 2. These guard periods are indicated by crosshatching in FIG. 9. The sizes of the guard periods depend on the temporal offset between the master and the slave piconets, and in this example, it can be seen from node M1's frame boundaries that time equivalent to one complete frame is lost, i.e., cannot be used to schedule data transfer, due to the guard times. Accordingly, the FD for the lost frame (the third FD in FIG. 9) includes a "NOP" (i.e., no operation) indication in the Use field.

It will be understood that these examples depict static scheduling, which is to say that the same types of transfers repeat periodically and there is no need to alter the content of the FS 510. In many cases, however, the frame scheduler must respond to the demands of a dynamic communication environment, in which data throughput can vary greatly from moment to moment. Also, the FS may need to handle scheduling of low-power modes, like Park, Hold, and Sniff. In such an environment, superframes can be preprogrammed during prescheduling periods for later use, with the content of each programmed superframe being loaded into the FS hardware and executed or reexecuted at the appropriate time(s).

Figure 10:
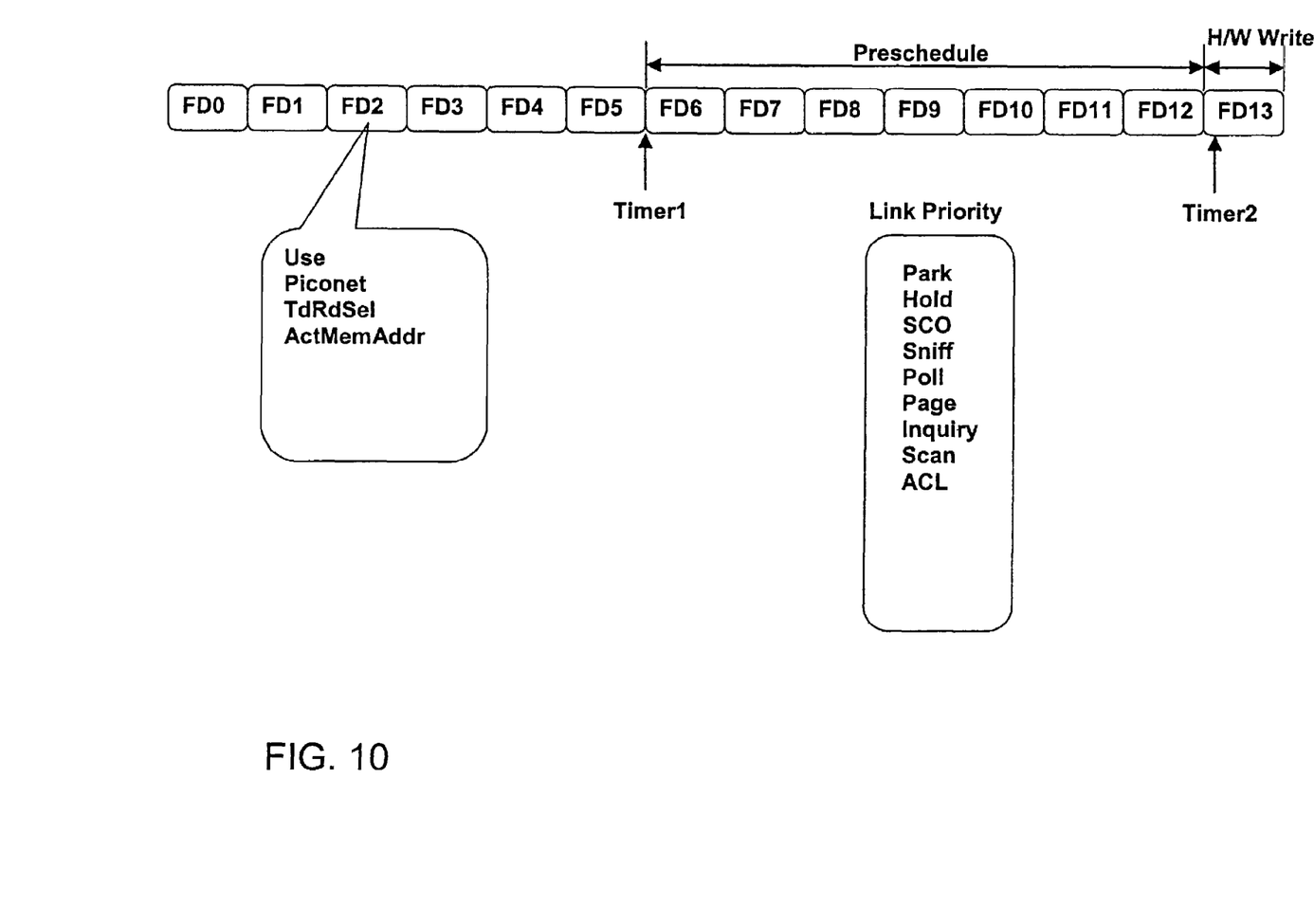
FIG. 10 depicts implementation of a scheduler with prescheduled frames in accordance with Applicants' invention.

FIG. 10 depicts an exemplary sequence of FDs for a FS case in which a superframe comprises fourteen FDs FD0, FD1, . . . , FD13. The scheduling process implemented by the FS includes two phases, a preschedule period and a period for writing the prescheduled data into the FS hardware. A timer Timer1, which may be cyclic, indicates the start of the preschedule period and another timer Timer2 indicates when data is to be written to the FS hardware. At every prescheduling instance, fourteen frames are programmed, although it will be appreciated that the number of preprogrammed frames (i.e., the size of the superframe) is not limited to fourteen but can be any number that is within the processing capability of the communication node and is suitable for the communication environment. As described above, each FD includes fields for identifying the use, piconet, transmit/receive descriptors, and active member address of the frame, and the Use fields of each frame are set up according to predetermined communication link priorities. A list of such link priorities is depicted in FIG. 10, showing as an example that SCO communication has higher priority than ACL communication and thus SCO frames are scheduled in the FS before ACL frames.

The invention has been described with reference to a BLUETOOTH™ communication system, but it will be apparent to one of ordinary skill in the art that the invention is applicable to other communication systems, both wired and wireless. It will also be appreciated that the procedures illustrated above may be readily implemented either in software that is executed by one or more suitable processors or by hardware, such as one or more application-specific integrated circuits (ASICs) and even discrete logic gates interconnected to perform specialized functions.

This invention can be embodied in many different forms without departing from its essential character, and thus the embodiments described above should be considered illustrative, not restrictive, in all respects. It is emphasized that the terms "comprises" and "comprising", as used in this description and the following claims, are meant as specifying the presence of stated features without precluding the presence of one or more other features. The intended scope of the invention is set forth by the following claims, rather than the preceding description, and all variations that fall within the scope of the claims are intended to be embraced therein.

What is claimed is:

1. A method for scheduling connection actions to be taken in a frame by a communication device that is a member of at least one ad-hoc communication network, comprising:

defining settings of a set of parameters of at least one frame descriptor for defining the connection actions to be taken in a certain frame, wherein said frame is a master to slave time slot followed by a slave to master time slot, wherein defining comprises defining a setting of a PCM descriptor that defines properties of a pulsecode-modulation ("PCM") interface associated with a voice descriptor referred to by the frame descriptor, and arranging said at least one frame descriptor in a frame descriptor arrangement according to a predetermined schedule.

2. The method according to claim 1, wherein arranging comprises arranging a plurality of frame descriptors in succession in the frame descriptor arrangement according to the predetermined schedule.

3. The method according to claim 1, comprising successively selecting each frame descriptor of the descriptor arrangement.

4. The method according to claim 1, wherein defining comprises defining the setting of a use parameter for indicating an action type to be taken in a certain frame, and a parameter for selecting one of a plurality of transmit, receive, and voice descriptors.

5. The method according to claim 4, wherein defining the setting of the use parameter comprises defining the setting of a transmit descriptor, which defines properties of a frame to be transmitted on an asynchronous connection-less ("ACL") communication link, and includes a packet-type parameter that indicates a type of frame to send; a payload-header-content parameter that indicates a content of a payload header; a data pointer that points to at least one location in the memory where information to be transmitted in the frame is stored; a bytes-remaining parameter that indicates a number of bytes of information that remain to be transmitted; and a start command;

wherein setting of:

each receive descriptor defines properties of a packet received on an ACL communication link and includes at least one data pointer that points to a respective location in the memory for storing received information; and each voice descriptor defines properties of a synchronous connection-oriented ("SCO") communication link that are significant for transmission and reception of voice data and includes parameters that indicate voice packet type, voice interface type, air interface encoding, voice data buffer pointer, and voice data length.

6. The method according to claim 1, wherein defining comprises defining a setting of a network descriptor.

7. The method according to claim 6, wherein defining a setting of the network descriptor includes defining a setting of a parameter that indicates whether the communication device is a master or a slave, a parameter that indicates signal timing in the communication network, and a frame-start-timing parameter that defines a frame offset, with respect to the communication network, for a slave in another communication network that is unsynchronized with the communication network.

8. The method according to claim 6, wherein defining a setting of the network descriptor comprises defining a correlation-window-size parameter for synchronizing the communication network and compensating for timing drift.

9. The method according to claim 1, wherein the step of defining comprises defining a setting of an active member address corresponding to another communication device, and/or a parameter for selecting a receive descriptor for broadcast frames.

10. The method according to claim 1, wherein defining comprises defining a setting of a parameter that indicates a transmit power for the respective frame.

11. The method according to claim 1, wherein arranging comprises arranging a plurality of frame descriptors successively in superframes that each include a number of frame descriptors determined by a selectable parameter.

12. The method according to claim 1, comprising storing in at least one circular buffer in the memory voice information to be transmitted and voice information that has been received.

13. A scheduling mechanism for a communication device that is a member of at least one ad-hoc network, for scheduling connection actions to be taken by a processor in a frame, said scheduling mechanism comprising:
- at least one frame descriptor arrangement stored in memory responsive to the processor;
- wherein the frame descriptor arrangement comprises at least one frame descriptor arranged in the descriptor arrangement according to a predetermined schedule, said frame descriptor includes a set of parameters describing the connection actions to be taken in a certain frame when said descriptor is selected according to an iterative pointer;
- wherein the set of parameters includes a use parameter indicating an action type to be taken in a certain frame, and a parameter for selecting at least one of a plurality of transmit, receive and voice descriptors;
- wherein each transmit descriptor defines properties of a packet to be transmitted on an asynchronous connection-less ("ACL") communication link and includes a packet-type parameter that indicates a type of packet to send, a data pointer that points to at least one location in the memory where information to be transmitted in the frame is stored, and a bytes-remaining parameter that indicates a number of bytes of information that remain to be transmitted;
- wherein each receive descriptor defines properties of a packet received on an ACL communication link and includes at least one data pointer that points to a respective location in the memory for storing received information; and
- wherein each voice descriptor defines properties of a synchronous connection-oriented ("SCO") communication link that are significant for transmission and reception of voice data and includes a parameter that indicate voice packet type.

14. A device according to claim 13, wherein the voice descriptor includes a parameter for voice interface type.

15. A device according to claim 14, wherein information to be transmitted and information that has been received comprises voice information, and the voice information is stored in at least one circular buffer in memory; and the voice descriptor includes parameters for a voice data buffer pointer, and voice data length.

16. A device according to claim 14, wherein the parameter for voice interface type is a PCM descriptor that defines properties of a pulse-coded-modulation ("PCM") interface.

17. A device according to claim 13, wherein the voice descriptor includes a parameter for air interface encoding.

18. A device according to claim 13, wherein the transmit descriptor includes a parameter for payload-header-content and a start command.

* * * * *